United States Patent
Korge-Hårajuvet et al.

(10) Patent No.: US 12,172,831 B2
(45) Date of Patent: Dec. 24, 2024

(54) LIFTING FRAME WITH WIRELESS COMMUNICATION

(71) Applicant: Autostore Technology AS, Nedre Vats (NO)

(72) Inventors: Geir Korge-Hårajuvet, Vikedal (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 581 days.

(21) Appl. No.: 17/602,878

(22) PCT Filed: Mar. 23, 2020

(86) PCT No.: PCT/EP2020/057985
§ 371 (c)(1),
(2) Date: Oct. 11, 2021

(87) PCT Pub. No.: WO2020/207777
PCT Pub. Date: Oct. 15, 2020

(65) Prior Publication Data
US 2022/0162000 A1 May 26, 2022

(30) Foreign Application Priority Data
Apr. 12, 2019 (NO) .................... 20190507

(51) Int. Cl.
*B65G 1/04* (2006.01)
*B66C 1/66* (2006.01)
(Continued)

(52) U.S. Cl.
CPC ......... *B65G 1/0464* (2013.01); *B65G 1/0478* (2013.01); *B65G 1/0492* (2013.01);
(Continued)

(58) Field of Classification Search
CPC .. B65G 1/0464; B65G 1/0478; B65G 1/0492; B65G 2201/0235
(Continued)

(56) References Cited

U.S. PATENT DOCUMENTS

2004/0189031 A1   9/2004  Zhu
2016/0325932 A1* 11/2016  Hognaland .......... B65G 1/0478
(Continued)

FOREIGN PATENT DOCUMENTS

CN    1390769 A    1/2003
CN  102832687 A   12/2012
(Continued)

OTHER PUBLICATIONS

International Search Report issued in International Application No. PCT/EP2020/057985, mailed Jun. 17, 2020 (4 pages).
(Continued)

*Primary Examiner* — Nathaniel R Pelton
(74) *Attorney, Agent, or Firm* — Baker Botts L.L.P.

(57) ABSTRACT

A container-handling vehicle for picking up storage containers from a three-dimensional grid of an underlying storage system includes a vehicle body and at least one lifting device with a lifting frame with gripper elements for releasable connection to a storage container, and a transmitter for communicating instructions for controlling the gripper elements. The lifting frame includes a first rechargeable power supply for supplying energy to the gripper elements. The container handling vehicle has at least one second rechargeable power supply configured to charging the first rechargeable power supply when the lifting frame is in a top most position. The at least one second rechargeable power supply is connected to at least one upper charger connector and the first rechargeable power supply is connected to at least one lower charger connector. The at least one lower
(Continued)

charger connector is attached to the upper side of the horizontal lifting frame and is connected to the first rechargeable power supply.

20 Claims, 4 Drawing Sheets

(51) Int. Cl.
  *B66C 13/14* (2006.01)
  *B66C 13/44* (2006.01)
(52) U.S. Cl.
  CPC .............. *B66C 1/663* (2013.01); *B66C 13/14* (2013.01); *B66C 13/44* (2013.01); *B65G 2201/0235* (2013.01)
(58) Field of Classification Search
  USPC .......................................................... 320/109
  See application file for complete search history.

(56) References Cited

U.S. PATENT DOCUMENTS

| | | | |
|---|---|---|---|
| 2016/0340122 | A1 | 11/2016 | Lindblom |
| 2019/0366863 | A1* | 12/2019 | Feldinger .................. B60L 5/42 |

FOREIGN PATENT DOCUMENTS

| | | |
|---|---|---|
| CN | 105540497 A | 5/2016 |
| CN | 207281127 U | 4/2018 |
| CN | 207510238 U | 6/2018 |
| CN | 109328150 A | 2/2019 |
| EP | 2450296 A1 | 5/2012 |
| JP | H0198476 U | 6/1989 |
| JP | H08138756 A | 5/1996 |
| JP | H1149480 A | 2/1999 |
| JP | 2003192106 A | 7/2003 |
| JP | 2018131334 A | 8/2018 |
| NO | 317366 B1 | 10/2004 |
| WO | 02100754 A1 | 12/2002 |
| WO | 2010135202 A2 | 11/2010 |
| WO | 2014090684 A1 | 6/2014 |
| WO | 2015019055 A1 | 2/2015 |
| WO | 2015193278 A1 | 12/2015 |
| WO | 2017129384 A1 | 8/2017 |
| WO | 2017134033 A1 | 8/2017 |
| WO | 2017220651 A1 | 12/2017 |

OTHER PUBLICATIONS

Written Opinion issued in International Application No. PCT/EP2020/057985; Dated Jun. 17, 2020 (10 pages).
International Preliminary Report on Patentability issued in International Application No. PCT/EP2020/057985; mailed Jul. 8, 2021 (26 pages).
Search Report issued in Norwegian Application No. 20190507; Dated Nov. 12, 2019 (2 pages).
Office Action issued in counterpart Chinese Patent Application No. 2020800426101 mailed on Nov. 30, 2022 (14 pages).
Decision of Rejection issued in counterpart Chinese Application No. 2020800426101, mailed Jan. 25, 2024 (17 pages).
Office Action issued in corresponding European Application No. 20715290.1, mailed May 6, 2024 (5 pages).
Office Action issued in counterpart Japanese Application No. 2021-559808, mailed Jan. 26, 2024 (10 pages).
Seijiro Nakata, Decision of Rejection in Japanese Patent Application No. 2021-559808, mailed Jul. 1, 2024, 6 pages (including translation), Japanese Patent Office, Tokyo, Japan.

* cited by examiner

"LIFTING FRAME WITH WIRELESS COMMUNICATION

TECHNICAL FIELD

The present invention regards a container-handling vehicle and a method for picking up storage containers from a three-dimensional grid of an underlying storage system, and more particularly a container-handling vehicle and method for picking up storage containers from a three-dimensional grid of an underlying storage system without transferring signals and power via lifting bands connecting a lifting frame to the container handling vehicle.

BACKGROUND OF THE INVENTION

FIG. 1 discloses a framework structure of a typical prior art automated storage and retrieval system 1 and FIGS. 2a and 2b disclose known container-handling vehicles of such a system. The storage system is disclosed in detail in for instance NO317366 and WO 2014/090684 A1.

The framework structure comprises a plurality of upright members/profiles 2 and a plurality of horizontal members 3, which are supported by the upright members 2. The members 2, 3 may typically be made of metal, e.g. extruded aluminium profiles.

The framework structure defines a storage grid 4 comprising multiple grid columns 12 arranged in rows. Most of the grid columns 12 are storage columns 5 in which storage containers 6, also known as containers, are stacked one on top of another to form stacks 7. Each storage container 6 (or container for short) may typically hold a plurality of product items that may be same or different product types depending on the application. The framework structure guards against horizontal movement of the stacks 7 of storage containers 6, and guides vertical movement of the containers 6, but does normally not otherwise support the storage containers 6 when stacked.

Each container-handling vehicle 9 comprises a lifting device 18 (shown in FIG. 2b) for vertical transportation of storage containers 6, e.g. raising a storage container 6 from and lowering a storage container 6 into a storage column 5. The lifting device 18 comprises a lifting frame 17, similar to the one shown in FIG. 2b, which is adapted to engage a storage container 6. The lifting frame 17 can be lowered from the vehicle body 12 so that the position of the lifting frame 17 with respect to the vehicle body 12 is adjusted in a third direction Z, which is orthogonal the first direction X and the second direction Y.

Each container-handling vehicle 9 comprises a storage compartment or space for receiving and stowing a storage container 6 when transporting the storage container 6 across the grid 4. The storage space may comprise a cavity 21 arranged centrally within the vehicle body 13, e.g. as is described in WO2014/090684A1, the contents of which are incorporated herein by reference.

Alternatively, the container-handling vehicles may have a cantilever construction, as is described in NO317366, the contents of which are also incorporated herein by reference.

In a storage grid, most of the grid columns 12 are storage columns 5, i.e. grid columns where storage containers are stored in stacks. However, a grid normally has at least one grid column 12 which is used not for storing storage containers, but which comprises a location where the container-handling vehicles can drop off and/or pick up storage containers so that they can be transported to an access station where the storage containers 6 can be accessed from outside of the grid or transferred out of or into the grid, i.e. a container handling station. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container-handling vehicles 9 can drop off storage containers to be transported to an access or a transfer station (not shown), and the second port 20 column may be a dedicated pick-up port column where the container-handling vehicles 9 can pick up storage containers that have been transported to the grid 4 from an access or a transfer station.

For monitoring and controlling the automated storage and retrieval system, e.g. monitoring and controlling the location of respective storage containers within the grid 4, the content of each storage container 6 and the movement of the container-handling vehicles 9 so that a desired storage container can be delivered to the desired location at the desired time without the container-handling vehicles 9 colliding with each other, the automated storage and retrieval system comprises a control system, which typically is computerised and comprises a database for keeping track of the storage containers.

When a storage container 6 stored in the grid 4 disclosed in FIG. 1 is to be accessed, one of the container-handling vehicles 9 is instructed to retrieve the target storage container from its position in the grid 4 and transport it to the drop-off port 19. This operation involves moving the container-handling vehicle 9 to a grid location above the storage column 5 in which the target storage container is positioned, retrieving the storage container 6 from the storage column 5 using the container-handling vehicle's lifting device (not shown, being internally arranged in a central cavity of the vehicle, but similar to the lifting device 18 of the second prior art vehicle of FIG. 2b), and transporting the storage container to the drop-off port 19. A second prior art vehicle 9 is shown in FIG. 2b to better illustrate the general design of the lifting device. Details of the second vehicle 9 are described in the Norwegian patent NO317366. The lifting devices 18 of both prior art vehicles 9 comprise a set of lifting bands 16 extending in a vertical direction and connected close to the corners of a lifting frame 17 (may also be termed a gripping device) for releasable connection to a storage container. The lifting frame 17 features container connecting elements 24 for releasably connecting to a storage container, and guiding pins 30 for aligning a storage container 6 to the lifting frame 17.

To raise or lower the lifting frame 17 (with or without a connected storage container 6), the lifting bands 16 are connected to a band drive assembly. In the band drive assembly, the lifting bands 16 are commonly spooled on/off at least two rotating lifting shafts or reels (not shown) arranged in the container-handling vehicle, wherein the lifting shafts are further connected via belts/chains to at least one common rotor shaft providing synchronized rotational movement to the at least two lifting shafts. Various designs of the lifting shafts are described in for instance WO2015/193278 A1 and WO2017/129384.

Most prior art container-handling vehicles having a central cavity for receiving a storage bin, as in FIG. 2a, features a lifting device 18 having a band drive assembly comprising at least one rotor shaft, centrally arranged in an upper section of the vehicle and connected to a lifting motor. In addition to the centrally arranged rotor shaft, such lifting devices comprise an assembly of secondary shafts and/or sheaves onto which the lifting bands are spooled on and off. The secondary shafts and/or sheaves are rotated by being connected to the centrally arranged rotor shaft via belts/chains and are arranged at the corners of the central cavity to provide the required positioning of the lifting bands 16 relative the lifting frame 17. Having such an assembly of multiple movable parts is not an optimal solution since the lifting devices are relatively service intensive and occupies a large volume inside the robot.

A drawback with these prior art container handling vehicles are related to the lifting frame 17 and the gripper elements. The gripper elements receive power and signals, for when to grip and release the containers, via cables embedded in the lifting bands. This solution may present complications when the lifting bands get worn. In the current solution the lifting bands are all wound up on a rotary shaft. The constant winding and unwinding of the lifting bands on the shaft every time the lifting frame 17 is either raised or lowered wears on the lifting bands.

When the lifting bands get worn there is a risk of the cables providing the gripper elements with power and operating signals also gets worn and since they are rolled up on the same rotary shaft there is a risk of short circuit. A short circuit in the bands can complicate and delay the system considerably e.g. if it occurs while the container handling vehicle is digging, i.e. moving storage containers on top of a specific storage container to be accessed. If the lifting device breaks down during digging it can be a large operation getting the container handling vehicle off the storage system and getting another container handling vehicle to take over the operation of the first container handling vehicle. Also, there is a risk of damaging the container and the goods in the container. A short circuit can also lead to fire.

In view of the above it is desirable to provide a container handling vehicle with a lifting device wherein the disadvantages of the prior art are avoided.

SUMMARY OF THE INVENTION

The present invention is defined by the attached claims and in the following:

A preferred embodiment of the present invention is defined by a container-handling vehicle for picking up storage containers from a three-dimensional grid of an underlying storage system, comprising a vehicle body and at least one lifting device with a lifting frame with gripper elements for releasable connection to a storage container, and a transmitter for communicating instructions for controlling the gripper elements, where the lifting frame further comprises a first rechargeable power supply for supplying energy to the gripper elements.

Further, the container handling vehicle has at least one second rechargeable power supply configured to charging the first rechargeable power supply when the lifting frame is in its top most position, and wherein the at least one second rechargeable power supply is connected to at least one upper charger connector and the first rechargeable power supply is connected to at least one lower charger connector.

The at least one upper charger connector comprises a spring-biased contact probe, optionally wherein the at least one upper charger connector comprises a contact probe, a spring, a fixing plate, a wire connecting nut, a contact probe fixing nut, and a fixing nut and the lower charger connectors are plates of an electrically conductive material.

The at least one second rechargeable power supply and the first rechargeable power supply is a Li-ion battery and/or a capacitor.

The communication for controlling the gripper elements is wireless communication between the transmitter and a receiver situated on the lifting frame, and the wireless communication is light communication, and the light communication is implemented by one or more of Visible Light Communication (VLC), Li-Fi, Irda, Optical Wireless Communication (OWC) or Reasonable Optical Near Joint Access (RONJA).

The transmitter is a first transceiver and the receiver is a second transceiver, and the transmitter and the receiver is installed to be in line of sight of each other.

The present invention is further defined by a method for picking up storage containers from a three-dimensional grid of an underlying storage system, using a container-handling vehicle comprising a vehicle body and at least one lifting device with a lifting frame with gripper elements for releasable connection to a storage container, and a transmitter for communicating instructions for controlling the gripper elements, wherein the method comprises the following steps lowering the lifting frame, communicating instructions to the lifting frame by means of the transmitter transmitting a signal to actuate the gripper elements, using a first rechargeable power supply, situated on the lifting frame, for supplying energy to actuate the gripper elements, lifting the lifting frame,
using a power reading device to read the charge level of the first rechargeable power supply, using a second rechargeable power supply to charge the first rechargeable power supply if the first rechargeable power supply has a charge level below a set threshold level.

Further the method is defined by using a first transceiver to communicate instructions to the lifting frame by means of transmitting light signals to a second transceiver to activate the gripper elements.

So, the present invention provides a solution where neither signals nor power is transferred directly from the container handling vehicle to the gripper elements on the horizontal lifting frame via electrical leads when the lifting frame is operating within the storage grid.

BRIEF DESCRIPTION OF THE DRAWINGS

Certain embodiments will now be described in greater detail by way of example only and with reference to the accompanying drawings, in which.

DETAILED DESCRIPTION

Figure 1:
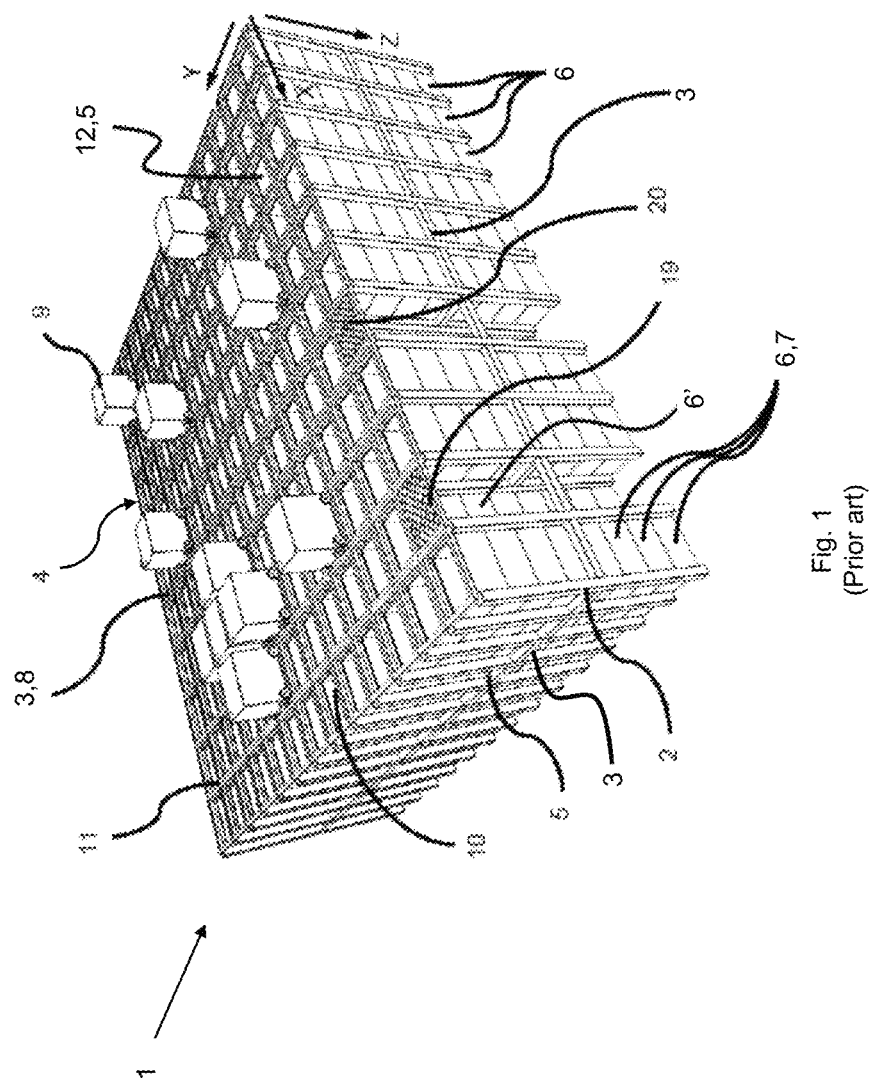
FIG. 1 is a perspective view of an exemplary storage system according to the present invention.

FIG. 1 is a perspective view of an exemplary storage system according to the present invention. Here it is disclosed a framework structure of a typical prior art automated storage and retrieval system 1. The framework structure comprises a plurality of upright members/profiles 2 and a plurality of horizontal members 3, which are supported by the upright members 2. The members 2, 3 may typically be made of metal, e.g. extruded aluminium profiles.

The framework structure defines a storage grid 4 comprising multiple grid columns 12 arranged in rows. Most of the grid columns 12 are storage columns 5 in which storage containers 6, also known as containers, are stacked one on top of another to form stacks 7. Each storage container 6 (or container for short) may typically hold a plurality of product items (not shown), and the product items within a storage container 6 may be identical or may be of different product types depending on the application. The framework structure guards against horizontal movement of the stacks 7 of storage containers 6, and guides vertical movement of the containers 6, but does normally not otherwise support the storage containers 6 when stacked.

Figure 2B:
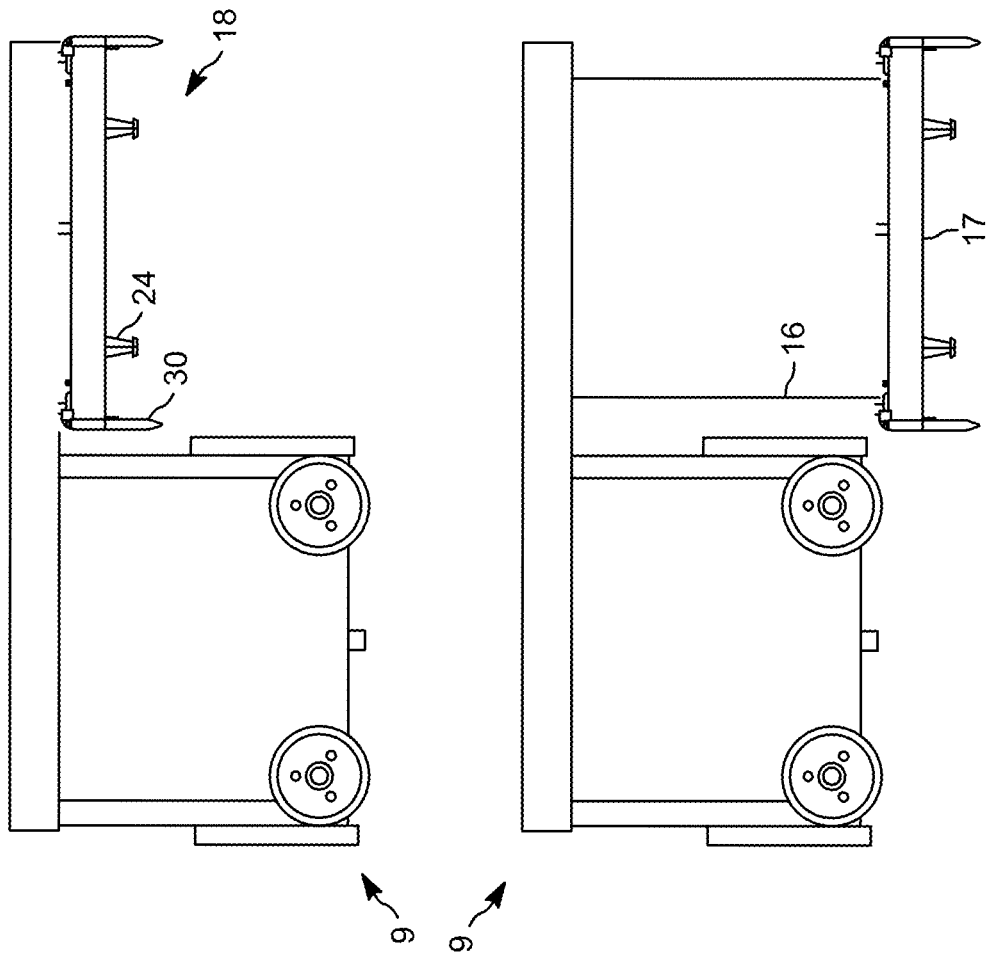
FIG. 2b is a side view of a prior art container handling vehicle wherein the lifting frame is displayed, first in a raised position and second in a slightly lowered position.
Figure 2A:
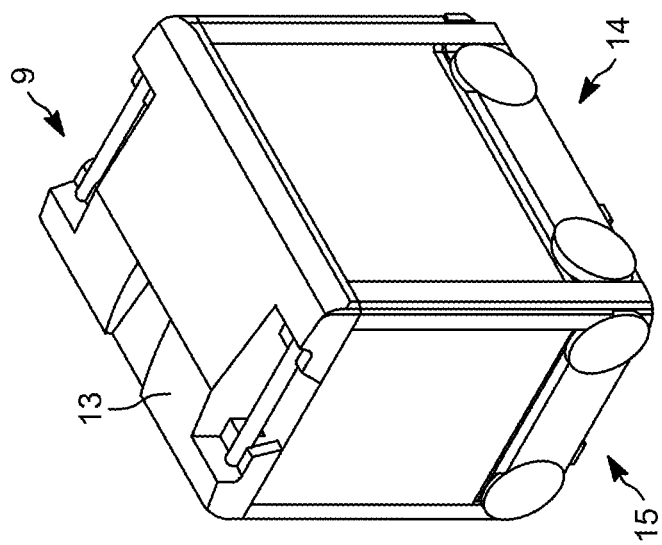
FIG. 2a is a perspective view of a prior art container handling vehicle with a central cavity for storing containers.

FIG. 2a is a perspective view of a prior art container handling vehicle with a central cavity for storing containers. In this solution the lifting device and the lifting frame 17 with the gripper elements is stored inside the central cavity when it is raised. The benefit of such a solution is that the container handling vehicle takes up less space of the underlying grid allowing for more container handling vehicles to operate at the same time.

FIG. 2b is a side view of a prior art container handling vehicle wherein the lifting frame 17 is displayed, first in a raised position and second in a slightly lowered position. The container handling vehicle presented here is a cantilever solution wherein the lifting device and the lifting frame 17 with the gripper elements are placed adjacent to the main body of the container handling vehicle. A benefit with this solution is that the container is placed away from the main power source and the electro motors running the container handling vehicles.

Figure 3:
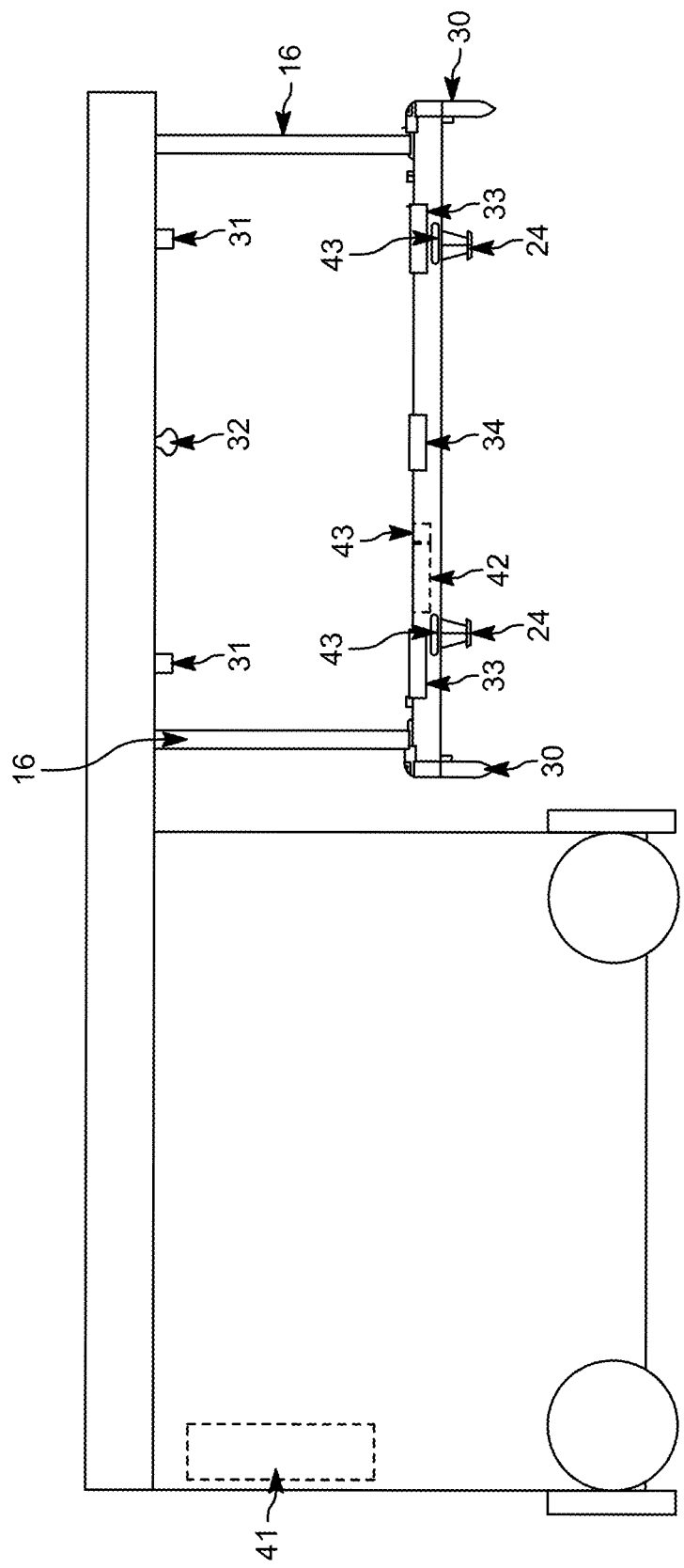
FIG. 3 is a side view of a container handling vehicle according to an embodiment of the present invention wherein the lifting frame is displayed in a slightly lowered position.

FIG. 3 is a side view of a container handling vehicle according to an embodiment of the present invention wherein the lifting frame 17 is displayed. Although the container handling vehicle displayed here is a cantilever solution the present invention can just as well be used on a container handling vehicle with a central cavity for storing containers.

The container handling vehicle comprises a main body and a cantilever extension. In the main body there is a second rechargeable power supply 41. This second rechargeable power supply 41 can preferably be a Li-ion battery or a capacitor. The second rechargeable power supply 41 delivers power to at least one electrically powered motor. The electrically powered motor maneuvers the container handling vehicle on the grid of the underlying storage system. The electrically powered motors provide motion to at least two sets of wheels. Further the main body can have a central control center.

In the embodiment presented in FIG. 3 there is a cantilever extension on the main body where the lifting device is situated. In an alternative embodiment the lifting device can be situated inside the body of a central cavity container handling vehicle. This makes no difference to the solution of the present invention.

The lifting device comprises a lifting band drive assembly connected to the vehicle body. To the lifting band drive assembly there is attached at least one rotatable lifting shaft. To the rotatable lifting shaft there is attached a plurality of lifting bands 16. To the lifting bands 16 there is attached a horizontal lifting frame 17. On this lifting frame 17 there is at least one set of gripping elements for releasable connection to a storage container.

To the bottom part of the cantilever extension there is attached at least one upper charger connector 31. The upper charger connector 31 is connected to the second rechargeable power supply 41. The second rechargeable power supply 41 can charge a first rechargeable power supply 42 situated on the horizontal lifting frame 17. The charging of the first rechargeable power supply 42 is done when the lifting frame 17 is at its upper most position.

The second rechargeable power supply 41 is the main power supply for the container handling vehicle. The power is used for manoeuvring the container handling vehicle and to give power to the lifting of the containers by the horizontal lifting frame 17. Further the second rechargeable power supply 41 is used to power the central controller system, which is the main computer system of the container handling vehicle, and to charge the second rechargeable power supply.

The first rechargeable power supply 42 is used to power the gripper elements 24 on the horizontal lifting frame 17. The first rechargeable power supply 42 is also situated on the horizontal lifting frame 17.

The at least one upper charge connector is connected to the second rechargeable power supply 41. The at least one upper charger connector 31 are touching at least one lower charger connector 33 when the horizontal lifting frame 17 is at its top most position. The at least one lower charger connector 33 is attached to the upper side of the horizontal lifting frame 17. From here it is connected to the first rechargeable power supply 42.

A power reading device 43 can check if the first rechargeable power supply 42 needs to be charged when the horizontal lifting frame 17 is at its top most position. If the first rechargeable power supply 42 needs to be recharged the power is transferred from the second rechargeable power supply 41 to the first rechargeable power supply 42 via the upper and the lower charger connectors 33. If the power reading device concludes that the first rechargeable power supply 42 do not need to be charged, no power is transferred from the second rechargeable power supply 41 to the first rechargeable power supply 42 via the upper and the lower charger connectors 33.

The first rechargeable power supply 42 can be a Li-ion battery or a capacitor.

The when the horizontal lifting frame 17 is lowered into the underlying grid of the storage system, vertical guide pins 30 ensures that the lifting frame 17 is lowered correctly into the shaft and connects properly with the container. There is a vertical guide pin in each corner of the horizontal lifting frame 17.

When the lifting frame 17 has connected properly to the container the central controller system tells the gripper elements 24 to grip the container. The central controller system communicates the information to a transmitter 32 using light as a medium for communication. The transmitter 32 is situated in a lower part of the cantilever extension. The transmitter 32 transmits information directly downwards to a receiver 34 situated on an upper surface of the horizontal lifting frame 17. From here the information received by the receiver is transmitted along a wire to the gripper elements 24 and the gripper elements 24 either grips a container or releases a container depending on the information sent by the central controller system.

The gripper element 24 is connected to a gripper sensor 43. The gripper sensor 43 gives information regarding if the gripper elements 24 are actually gripping a container. The sensor can give this information in the form of feedback to the central controller system. Further, the gripper sensor 43 can also measure the amount of force the gripper elements 24 are using.

Further the transmitter 32 can be a first transceiver and the receiver 34 can be a second transceiver ensuring a two-way communication between the lifting frame 17 and the central control system.

The light communication can be implemented by one or more of Visible Light Communication (VLC), Li-Fi, Irda, Optical Wireless Communication (OWC) or Reasonable Optical Near Joint Access (RONJA).

Further the transmitter 32 and the receiver 34 must be in line of sight of each other.

Figure 4:
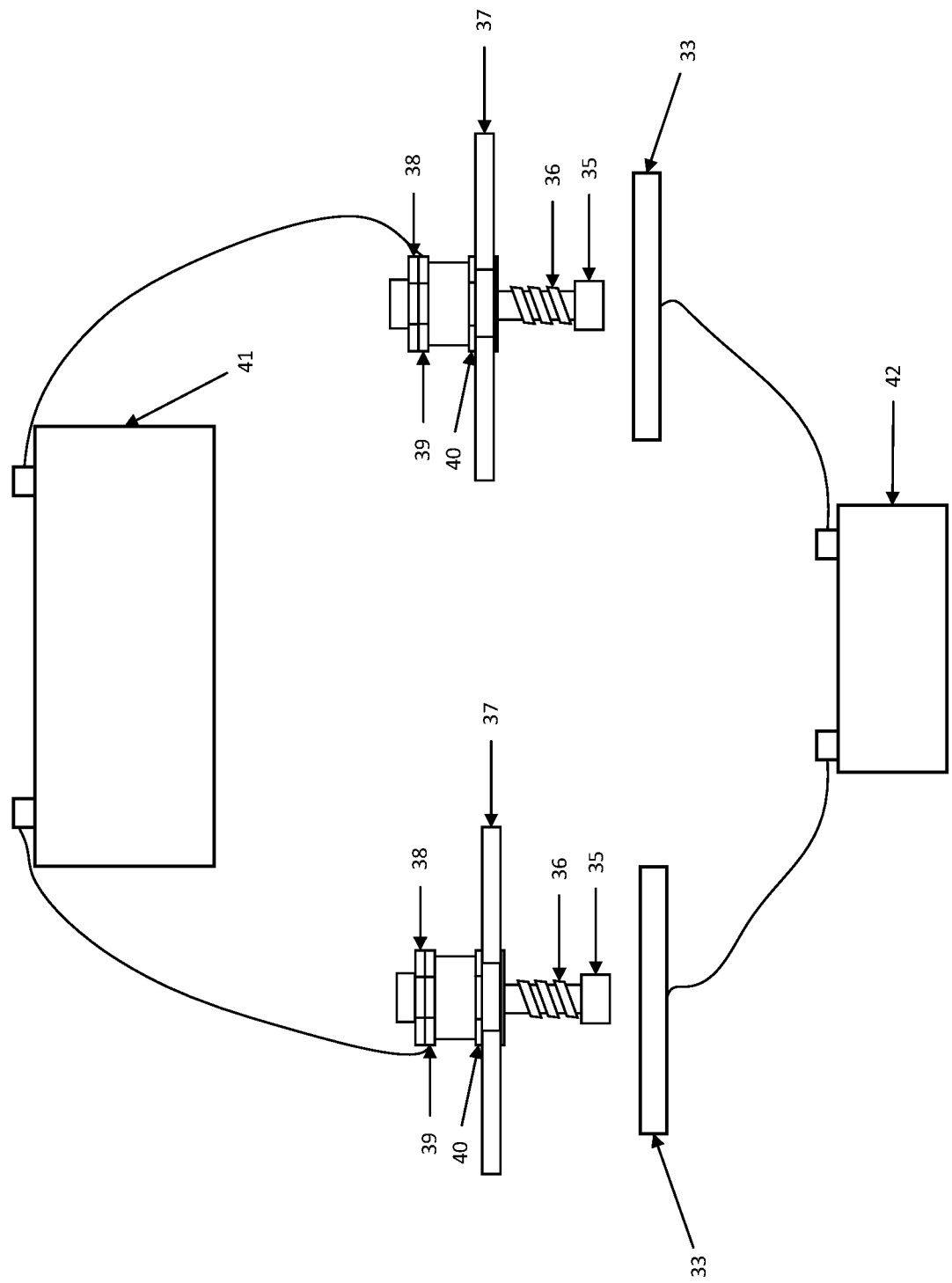
FIG. 4 is a side view of the charging circuit of how the first rechargeable power source can charge the second rechargeable power source.

FIG. 4 is a side view of the charging circuit of how the second rechargeable power supply 41 can charge the first rechargeable power supply 42 according to a preferred embodiment of the present invention.

The second rechargeable power supply 41 is connected to two upper charger connectors 31. The contact probe 35 of the upper charger connectors 31 protrudes from the bottom surface of the cantilever extension. In a central cavity solution, the contact probe 35 of the upper charger connector 31 will protrude slightly from a lower part of the cantilever extension of the container handling vehicle.

When the lifting frame 17 is in its top most position, the two upper charger connectors 31 are in physical contact with a corresponding pair of lower charger connectors 33. These lower charger connectors 33 according to a preferred embodiment of the present invention is in the form of plates of an electrically conductive material. The lower charger connectors 33 are mounted to the top side of the lifting frame 17. The lower and the upper charger connectors 31 are adjacent to each other so that they will touch when the lifting frame 17 is in its top most position.

A power reading device 43 can read of the charge level of the first rechargeable power supply 42 when the upper and the lower charger connectors 33 are in physical contact with each other. If the first rechargeable power supply 42 need to be recharged the second rechargeable power supply 41 will charge the second rechargeable power supply. If the first rechargeable power supply 42 has sufficient charge no power is transferred from the second rechargeable power supply 41 to the first rechargeable power supply 42.

Each upper charger connector 31 comprises a contact probe 35, a spring 36, a fixing plate 37, a wire connecting nut 38, a contact probe fixing nut 39, and a fixing nut 40. The contact probe goes through the center of the entire upper charger connector 31 and is preferably an electrode of conductive metal like e.g. copper. Between the contact probe 35 and the fixing plate 37, there is a spring 36. The spring 36 biasing the contact probe 35 towards the fixing plate 37 ensures a reliable connection between the upper and the lower charger connector 33. The upper charger connector 31 is fixed to a fixing plate with a fixing nut. The contact probe is fixed to the rest of the upper charger connector 31 with a contact probe fixing nut. The wires from the second rechargeable power supply 41 is fixed between the contact probe fixing nut and a wire connecting nut.

The invention claimed is:

1. A container handling vehicle for picking up storage containers from a three-dimensional grid of an underlying storage system, comprising a vehicle body and at least one lifting device with a lifting frame with gripper elements for releasable connection to a storage container, and a transmitter for communicating instructions for controlling the gripper elements, wherein the lifting frame further comprises a first rechargeable power supply for supplying energy to the gripper elements, wherein the container handling vehicle has at least one second rechargeable power supply configured to charge the first rechargeable power supply when the lifting frame is in a top most position, wherein the at least one second rechargeable power supply is connected to at least one upper charger connector and the first rechargeable power supply is connected to at least one lower charger connector, and wherein the at least one lower charger connector is attached to an upper side of the lifting frame and is connected to the first rechargeable power supply.

2. The container handling vehicle according to claim 1, wherein the at least one upper charger connector comprises a spring-biased contact probe, and wherein the at least one upper charger connector comprises a contact probe, a spring, a fixing plate, a wire connecting nut, a contact probe fixing nut, and a fixing nut.

3. The container handling vehicle according to claim 2, wherein the spring-biased contact probe has an internal spring.

4. The container handling vehicle according to claim 1, wherein the at least one lower charger connector is a plate of an electrically conductive material.

5. The container handling vehicle according to claim 1, wherein the at least one second rechargeable power supply is a Li-ion battery or a capacitor.

6. The container handling vehicle according to claim 1, wherein the first rechargeable power supply is a Li-ion battery or a capacitor.

7. The container handling vehicle according to claim 1, wherein the communication for controlling the gripper elements is wireless communication between the transmitter and a receiver situated on the lifting frame.

8. The container handling vehicle according to claim 7, wherein the wireless communication is light communication.

9. The container handling vehicle according to claim 8, wherein the light communication is implemented by one or more of Visible Light Communication (VLC), Li-Fi, Irda, Optical Wireless Communication (OWC) or Reasonable Optical Near Joint Access (RONJA).

10. The container handling vehicle according to claim 9, wherein the transmitter is a first transceiver and the receiver is a second transceiver.

11. The container handling vehicle according to claim 7, wherein the transmitter and the receiver are installed to be in line of sight of each other.

12. The container handling vehicle according to claim 1, wherein the lifting frame is a horizontal lifting frame.

13. A method for picking up storage containers from a three-dimensional grid of an underlying storage system, using a container handling vehicle comprising a vehicle body and at least one lifting device with a lifting frame with gripper elements for releasable connection to a storage container, and a transmitter for communicating instructions for controlling the gripper elements, wherein the method comprises:

lowering the lifting frame, communicating instructions to the lifting frame by means of the transmitter transmitting a signal to actuate the gripper elements, using a first rechargeable power supply, situated on the lifting frame, for supplying energy to actuate the gripper elements, lifting the lifting frame, using a power reading device to read a charge level of the first rechargeable power supply, using at least one second rechargeable power supply to charge the first rechargeable power supply if the first rechargeable power supply has a charge level below a set threshold level, and using the at least one second rechargeable power supply of the container handling vehicle to charge the first rechargeable power supply when the lifting frame is in a topmost position, wherein the at least one second rechargeable power supply is connected to at least one upper charger connector and the first rechargeable power supply is connected to at least one lower charger connector, and wherein the at least one lower charger connector is attached to an upper side of the lifting frame and is connected to the first rechargeable power supply.

14. The method according to claim 13, further comprising using a Li-ion battery or a capacitor as the first rechargeable power supply.

15. The method according to claim 13, further comprising using a Li-ion battery or a capacitor as the at least one second rechargeable power supply.

16. The method according to claim 13, further comprising using wireless communication between the transmitter and a receiver.

17. The method according to claim 16, further comprising using light communication as the wireless communication between the transmitter and the receiver.

18. The method according to claim 16, further comprising using a first transceiver as the transmitter and a second transceiver as the receiver.

19. The method according to claim 13, further comprising using one or more of Visible Light Communication (VLC), Li-Fi, Irda, Optical Wireless Communication (OWC) or Reasonable Optical Near Joint Access (RONJA) as light communication.

20. The method according to claim 13, wherein the lifting frame is a horizontal lifting frame.

* * * * *